US011677835B2

(12) United States Patent
Mathur et al.

(10) Patent No.: US 11,677,835 B2
(45) Date of Patent: Jun. 13, 2023

(54) REDUCING NETWORK BANDWIDTH FOR REMOTE CONTENT DISPLAY

(71) Applicant: Adobe Inc., San Jose, CA (US)

(72) Inventors: Rachit Mathur, Bangalore (IN); Himanshu Kumar, Bangalore (IN); Amit Aggarwal, Bangalore (IN)

(73) Assignee: Adobe Inc., San Jose, CA (US)

( * ) Notice: Subject to any disclaimer, the term of this patent is extended or adjusted under 35 U.S.C. 154(b) by 3 days.

(21) Appl. No.: 17/452,140

(22) Filed: Oct. 25, 2021

(65) Prior Publication Data

US 2023/0127334 A1 Apr. 27, 2023

(51) Int. Cl.
*H04L 67/131* (2022.01)
*H04L 49/90* (2022.01)
(52) U.S. Cl.
CPC ............ *H04L 67/131* (2022.05); *H04L 49/90* (2013.01)
(58) Field of Classification Search
CPC .............................. H04L 67/131; H04L 49/90
See application file for complete search history.

(56) References Cited

U.S. PATENT DOCUMENTS

| | | | | |
|---|---|---|---|---|
| 10,270,704 B2* | 4/2019 | Desjardins | .............. | H04L 47/32 |
| 11,546,392 B2* | 1/2023 | Braganza | .............. | H04L 51/216 |
| 2007/0288640 A1* | 12/2007 | Schmieder | ............ | G06F 3/0481 |
| | | | | 709/227 |
| 2019/0196185 A1* | 6/2019 | Kimura | ................ | G09G 3/3225 |

* cited by examiner

*Primary Examiner* — Tejis Daya
(74) *Attorney, Agent, or Firm* — Weaver Austin Villeneuve & Sampson LLP

(57) ABSTRACT

Techniques for reducing network bandwidth for remote content display include storing, in a buffer, by a first client device of a plurality of client devices participating in a co-editing session, a plurality of cursor coordinates of a cursor displayed on a display of the first client device. The plurality of cursor coordinates are stored in the buffer during a throttle time period. Responsive to a determination that the throttle time period has elapsed, the first client device obtains from the buffer and transmits the plurality of cursor coordinates in a data packet. Receipt of the plurality of cursor coordinates enables a representation of the cursor to be displayed on displays of each of the plurality of client devices other than the first client device based at least in part on the plurality of cursor coordinates.

20 Claims, 8 Drawing Sheets

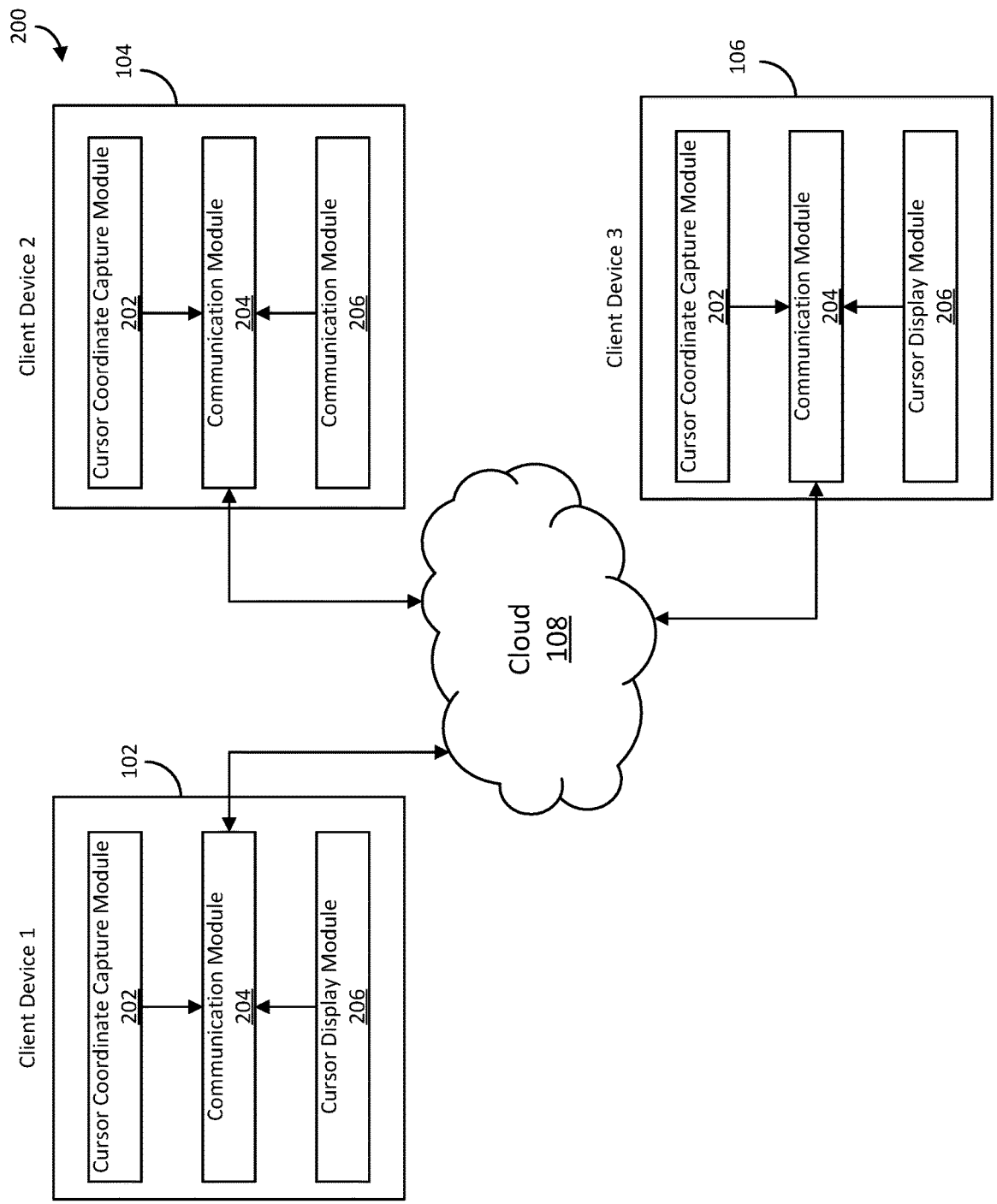

REDUCING NETWORK BANDWIDTH FOR REMOTE CONTENT DISPLAY

BACKGROUND

Co-editing environments such as interactive sessions in which multiple client devices are displaying and modifying a shared document consume large network bandwidths. In addition to broadcasting content of a document being processed to each client device, representations of input controls (e.g., a cursor associated with a mouse) of each client device are also transmitted. This allows the document to be presented at each client device along with cursor positions of all other client devices participating in the interactive session. Conventional techniques involve multiple broadcasts of cursor positions every second. For example, when 5-10 devices are participating in an interactive session, the data rate received at each client device participating in the interactive session, solely for cursor position, is on the order of about 35-70 kilobytes/second. In some cases, the large network bandwidth consumption used for cursor representation slows down other functions of the co-editing environment, or other functions of each client device by wasting processor time. Accordingly, techniques for reducing network bandwidth for remote content display are desirable.

SUMMARY

In some embodiments, a non-transitory computer-readable medium comprises instructions that, when executed by at least one processor, cause the at least one processor to perform operations that include storing, in a buffer, by a first client device of a plurality of client devices participating in a co-editing session, a plurality of cursor coordinates of a cursor displayed on a display of the first client device. The plurality of cursor coordinates are stored in the buffer during a throttle time period. In some embodiments, responsive to a determination that the throttle time period has elapsed, the first client device obtains from the buffer and transmits the plurality of cursor coordinates. Receipt of the plurality of cursor coordinates enables a representation of the cursor to be displayed on displays of each of the plurality of client devices other than the first client device based at least in part on the plurality of cursor coordinates.

BRIEF DESCRIPTION OF THE DRAWINGS

FIG. 2 shows an example of a system for implementing a co-editing environment in accordance with one embodiment.

Like reference numbers and designations in the various drawings indicate like elements.

DETAILED DESCRIPTION OF EMBODIMENTS

Term Definitions

Figure 1:
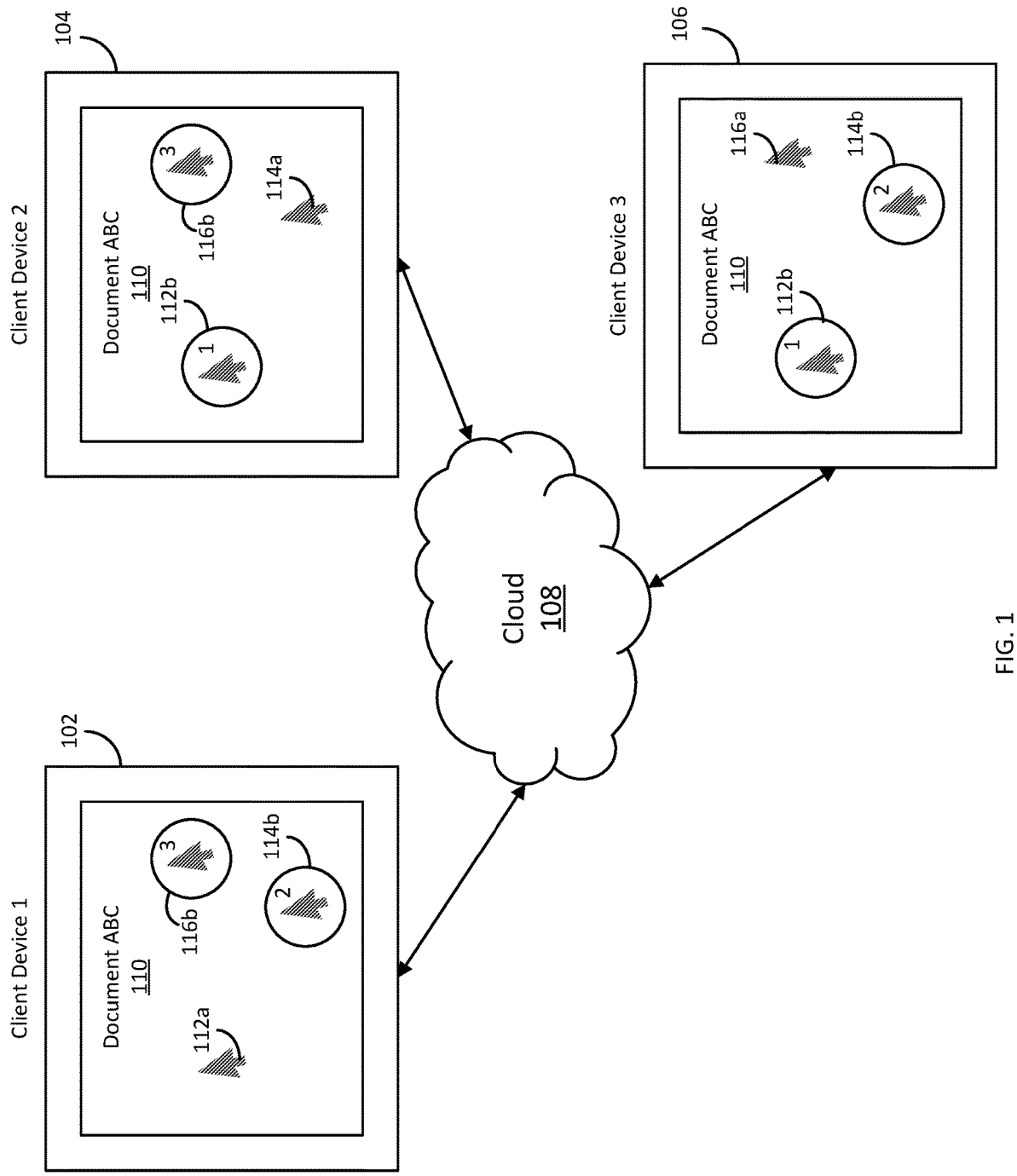
FIG. 1 shows an example of a co-editing environment in accordance with one embodiment.

As used herein, a "co-editing environment" or "co-editing session" or "interactive session" refers to a group of client devices that are accessing and/or modifying the same document and/or copies of the same document. In one embodiment, each client device is communicatively coupled to a server device or a cloud device such that communications from a client device are passed to the server device or the cloud device as an intermediary to being transmitted to the other co-editing devices participating in the co-editing environment or co-editing session.

As used here, a "cursor" refers to a representation of a current position of a user interaction control element (e.g., a mouse, a finger on a track pad or touchscreen, a stylus on a touchscreen, etc.). In one embodiment, a cursor is associated with a "cursor position" which indicates a position (e.g., in Cartesian coordinates) of the cursor on a display of a client device.

As used herein, a "module" refers to a portion of computer-executable instructions. In one embodiment, a module is implemented by a hardware processor, which executes the corresponding computer-executable instructions. A hardware processor is an integrated circuit device associated with a computing device, such as a server or a user device (e.g., a desktop computer, a laptop computer, a tablet computer, a mobile phone, or the like), which is programmable to perform specific tasks. In one embodiment, multiple modules are implemented as a single module. In one embodiment, a single module is implemented as multiple modules. In one embodiment, two or more modules are executed by the same device (e.g., the same server, the same computing device, etc.).

Reducing Network Bandwidth for Remote Content Display

Techniques for reducing network bandwidth for remote content display, such as representations of cursors of remote devices participating in a co-editing session are provided herein. In conventional co-editing environments, a substantial amount of network bandwidth is taken up by cursor movements of the client devices participating in the co-editing session. The network bandwidth taken up by cursor movements increases dramatically as the number of connected client devices increases because the cursor movement of each client device is transmitted to every other client device. To reduce the amount of network bandwidth taken up by cursor movements of the client devices, the techniques disclosed herein improve on both the timing and amount of cursor movements that are transferred across the network, as well as the capturing of the cursor movements at the client devices.

For example, in one embodiment, each client device of a set of client devices participating in a co-editing session captures cursor coordinates indicating positions of a cursor at a series of time points, and a portion of the captured cursor coordinates are placed in a buffer. In one example, the cursor coordinates placed in the buffer are separated by a minimum time duration. In other words, the cursor coordinates placed in the buffer represent a sampling of the captured cursor coordinates. The cursor coordinates are placed in the buffer until a throttle time period has elapsed. Responsive to the throttle time period elapsing, a single data packet is generated that includes the content of the buffer. The packet is then transmitted to every other client device participating in the co-editing session (e.g., via an intermediate cloud service associated with the co-editing session).

In one embodiment, cursor coordinates are captured responsive to a mouse movement event or cursor movement event occurring. Hence, in an instance where there is little or no cursor movement, the buffer remains empty or nearly empty. In one embodiment, cursor coordinates are stored in the buffer responsive to meeting certain minimum movement threshold criteria. For example, in one embodiment, a cursor coordinate is stored in the buffer in response to determining that a distance between the cursor coordinate and a previously stored cursor coordinate exceeds a threshold. In other words, because cursor coordinates are captured responsive to movement events and/or are stored in a buffer in response to a minimum movement criteria being satisfied, a size of the buffer, and therefore, the corresponding data packet that includes the content of the buffer, varies within a co-editing session. Accordingly, data is transmitted in a manner that is optimized to capturing actual cursor movement rather than transmitting unnecessary cursor coordinates resulting from small movements.

By sampling captured cursor coordinates that are ultimately provided to the other devices and by collating sampled captured cursor coordinate into a buffer that spans the throttle time period, network bandwidth used to display remote device cursors is substantially reduced relative to conventional techniques. For example, conventional techniques transmit each captured cursor coordinate to every client device participating in the co-editing session, with each cursor coordinate placed in an individual data packet. For example, in an environment with 11 client devices participating in a data session and a packet size of 72 bytes (each packet storing a single cursor coordinate), transmitting each captured coordinate leads to an inbound data rate of 720 kilobytes per second. Using the techniques described herein, for a throttle time period of 500 milliseconds and for 27 captured cursor coordinates spanning the throttle time period (e.g., for 27 elements in the buffer), the inbound data rate is reduced to about 5.6 kilobytes per second. While each packet is bigger than that of conventional techniques, fewer packets are transmitted, because more cursor coordinates are bundled in a single packet. Transmission of fewer packets reduces the amount of overhead (e.g., fixed length packet headers) and also ameliorates problems associated with dropped packets. Moreover, because, in one embodiment, the buffer is only filled with cursor coordinates responsive to a mouse movement detection event and/or responsive to cursor movement exceeding a threshold, buffers, and therefore data packets, vary in size. Accordingly, for instances in which there is little cursor movement during a particular throttle time period, the packet size is considerably smaller, thereby further reducing network bandwidth demands. In one embodiment, network bandwidth is reduced by up to 90-95% using the techniques described herein.

In one embodiment, representations of cursors of other devices participating in the co-editing session (sometimes referred to herein as "remote cursors") are rendered on a client device in a manner that allows the client device to optimize computing resources across multiple functions other than that used for remote cursor display. For example, in one embodiment, rather than rendering representations of the remote cursor in a manner that strictly follows the cursor coordinates included in a received buffer, the client device determines timing information that relates a present time a representation of the remote cursor is to be displayed with respect to timing information associated with the buffer (e.g., the throttle time period). Continuing with this example, the client device interpolates between cursor coordinates indicated in the buffer based at least in part on the timing information, thereby allowing the client device to utilize the cursor coordinates in the buffer at time points that the client device is available to render the representation of the remote cursor. In one embodiment, the representation of the remote cursor is rendered as a movement between successive cursor positions (e.g., as an animation), where the positions correspond to cursor coordinates stored in the buffer or are interpolated between successive cursor coordinates stored in the buffer.

By presenting representations of remote cursors on a display of the client device in a manner that considers the usage of computing resources of the client device, representations of remote cursors are rendered in a manner representative of the movement of the remote cursor while accounting for and/or prioritizing utilization of the computational resources of the client device. Moreover, the techniques described herein allow the client device to adjust how the remote cursors are represented based on the usage of computing resources during a co-editing session. In one example, a remote cursor is presented on the client device with every captured cursor coordinate from the remote device rendered when there is a surplus of computational resources available on the client device. Continuing with this example, responsive to usage of computational resources increasing on the client device (e.g., when the client device is concurrently executing other tasks), subsequent representations of the remote cursor are presented using a subset of the captured cursor coordinates (e.g., rather than causing the remote cursor to traverse through all of the captured cursor coordinates). This allows the computational resources of the client device to be applied to higher priority functions than to remote cursor representation. Continuing still further with this example, responsive to usage of computational resources decreasing on the client device, the client device reverts to a more computationally intensive manner of presenting remote cursor representations, e.g., by causing the remote cursor representation to traverse through all of the captured cursor coordinates.

FIG. 1 shows an example of a co-editing environment in accordance with one embodiment. As illustrated, three client devices, 102, 104, and 106 are participating in the co-editing environment depicted in FIG. 1. Each client device is communicatively coupled to a cloud service 108. In one embodiment, cloud service 108 includes one or more servers.

Each client device is associated with a display (e.g., a laptop screen, a monitor, a tablet computer screen, etc.) on which a document 110 that is being edited within a co-editing session of the co-editing environment is presented. The display of each client device presents a cursor, which indicates a position associated with a user input control (e.g., a mouse position, a position of a finger on a trackpad, a position of a finger on a touch screen, etc.). For example, client device 102 depicts cursor 112*a*, associated with a user input control of client device 102. Similarly, client device 104 depicts cursor 114*a*, and client device 106 depicts cursor 116*a*.

In one embodiment, within document 110 as presented on a particular client device, representations of the cursors of the other client devices are also presented. For example, cursor 114*b* is presented on client device 102 as a representation of cursor 114a associated with client device 104, and cursor 116b is presented on client device 102 as a representation of cursor 116a associated with client device 106. Similarly, cursor 112b is presented on client device 104 as a representation of cursor 112a associated with client device 102, and cursor 116b is presented on client device 104 as a representation of cursor 116a associated with client device 106. Cursor 112b is presented on client device 106 as a representation of cursor 112a associated with client device 102, and cursor 114b is presented on client device 106 as a representation of cursor 114a associated with client device 104. In one embodiment, in instances in which a cursor of a particular device is positioned off of the document being edited, the representation of the cursor on the other devices is not presented. It should be noted that, in one embodiment, a remote cursor representation (e.g., 112b, 114b, and/or 116b) are not presented at positions that exactly correspond to the cursor position of the corresponding device. In one embodiment, a remote cursor representation is presented at an interpolated position (e.g., as shown in and described below in connection with FIG. 6). In one example, an interpolated position is based at least in part on a computational load of the client device presenting the remote representation. Moreover, in one embodiment, a remote cursor position 112b corresponding to a cursor of client device 102 that is presented on client devices 104 and 106 may be presented at slightly different positions on client device 104 relative to client device 106. For example, because, in one embodiment, remote cursor representations are presented based at least in part on computational load of the client device presenting the remote representation, remote cursor position 112b varies on different client devices based on the respective computational loads.

In one embodiment, remote cursor representations (e.g., cursors 112b, 114b, and 116b) are presented in a visual manner that indicates the cursor is associated with another client device. For example, in FIG. 1, the remote cursor representations are depicted with a circle around the representation. Other examples of visual manners include cursors shaded in in various colors, remote cursor representations depicted with an identifier of the client device with which the remote cursor representation is associated, or the like.

In one embodiment, each client device participating in a co-editing session captures cursor coordinates over a time period (generally referred to herein as a "throttle time period"), generates a buffer that includes the cursor coordinates (or data representative of the cursor coordinates), and transmits a packet that includes content of the buffer. In one embodiment, a cloud service receives the packet and transmits the packet to the other client devices participating in the co-editing session. The cursor coordinates stored in the buffer are separated by a minimum time period (generally referred to herein as a "sampling time period"). Example values of the sampling time period are 10 milliseconds, 15 milliseconds, 18 milliseconds, 21 milliseconds, or the like. Generally, the sampling time period is substantially less than the throttle time period. Example values of the throttle time period are 400 milliseconds, 500 milliseconds, 600 milliseconds, 700 milliseconds, or the like. By bundling multiple cursor coordinates (e.g., those captured during the throttle time period) into one data packet, fewer data packets are transmitted to the cloud service. Moreover, by limiting the cursor coordinates stored in the buffer to those separated by at least the sampling time period, fewer cursor coordinates are transmitted.

In one embodiment, each client device receives packets from the cloud service, where each packet was transmitted to the cloud service by a different client device participating in the co-editing environment and includes content of a buffer indicating cursor coordinates of a cursor of the respective client device over the throttle time period. For a given packet, the client device then extracts the buffer, and uses the cursor coordinates indicated in the buffer to display a representation of the cursor of the client device that transmitted the packet. In one embodiment, the representation of the cursor comprises a movement of the cursor from a first position to a second position (e.g., as an animation or as a series of animations), where the first position and the second position are determined based at least in part on the cursor coordinates indicated in the buffer. By presenting animations of sampled cursor coordinates, the representation of the cursor is presented in an approximation of the cursor path traversed by the cursor on the remote device without requiring each intermediate cursor position along the cursor path. In one example, the first position and the second position are each cursor coordinates included in the buffer. In another example, at least one of the first position and the second position is an interpolated position between two successive cursor coordinates included in the buffer.

FIG. 2 shows a diagram of an example system 200 for reducing network bandwidth for remote content display in accordance with one embodiment. As illustrated, system 200 includes first client device 102, second client device 104, and third client device 106, each participating in a co-editing session. Each of client devices 102-106 are communicatively coupled to cloud service 108. In one embodiment, each of client devices 102-106 includes a cursor coordinate capture module 202, a communication module 204, and a cursor display module 206.

Cursor coordinate capture module 202 is configured to capture cursor positions of a cursor of the client device on which cursor coordinate capture module 202 is operating. In one embodiment, cursor coordinate capture module 202 captures cursor positions and stores cursor positions in a buffer (e.g., in an array). In one example, cursor coordinate capture module 202 captures more cursor positions than are stored in the buffer. As a more particular example, cursor coordinate capture module 202 captures multiple cursor positions during a sampling time period, but only one cursor position per sampling time period is stored in the buffer. In one embodiment, cursor coordinate capture module 202 begins capturing cursor positions in response to detection of a mouse movement event. It should be understood that a mouse movement event as used herein refers to movement of an external mouse device, a finger on a trackpad, a finger or stylus on a touchscreen, or the like. In one embodiment, cursor coordinate capture module 202 determines whether to store a particular cursor coordinate in the buffer based on a distance of the cursor coordinate from a previously stored cursor coordinate. In one example, cursor coordinate capture module 202 stores a cursor coordinate in the buffer in response to determining that a distance between the cursor coordinate and the previously stored cursor coordinate in the buffer exceeds a threshold distance (e.g., more than 10 pixels, more than 15 pixels, or the like). It should be noted that, because cursor coordinates are captured responsive to mouse movement events and/or stored in the buffer responsive to the distance between cursor coordinates exceeding a threshold, it is possible for the size of the buffer to vary from one throttle time period to another. In one embodiment, cursor coordinate capture module 202 fills the buffer with captured cursor positions until a predetermined throttle period has elapsed. Cursor coordinate capture module 202 then provides the buffer to communication module 204. An example of a process executed by cursor coordinate capture module is shown in and described below in connection with FIG. 4.

It should be noted that, in one embodiment, particular types of cursor coordinate information are not throttled (e.g., stored in a buffer until the predetermined throttle time period has elapsed). In one example, in an instance in which a user of the client device is performing a drag and drop action (e.g., to move a content item presented on the display), such cursor movement is not stored in the buffer. Rather, in this example, data indicating such cursor movement is transmitted in batches to cloud 208 for rendering on the other client devices. Continuing with this example, after the drag and drop action has been completed (e.g., after the content item has been dropped), cursor coordinates resume being buffered during a throttle time period.

In one embodiment, communication module 204 is configured to generate an outbound data packet (e.g., a single data packet) that includes the content of a buffer after the throttle time period has elapsed. In one embodiment, the outbound data packet is a User Datagram Protocol (UDP) packet. In another embodiment, the outbound data packet is associated with a different communication protocol, such as transmission communication protocol (TCP) or the like. In one embodiment, because the size of the buffer is variable, the size of the outbound data packet is correspondingly variable. In one example, the buffer, and therefore the outbound data packet is larger for throttle time periods with many mouse movements and/or a long duration of mouse movements. In another example, the buffer, and therefore the outbound data packet, is larger for throttle time periods with mouse movements that traverse a larger distance, because fewer captured coordinates are discarded as being within a predetermined distance to a previous stored coordinate. An example of a process executed by communication module 204 for generating and transmitting an outbound data packet is shown in and described below in connection with FIG. 5A.

In one embodiment, communication module 204 is configured to receive one or more inbound data packets, where each inbound data packet is transmitted by another client device participating in the co-editing session with the client device on which communication module 204 is operating. Each inbound data packet includes content of a buffer indicative of cursor movements on the client device that transmitted the inbound data packet. In one embodiment, communication module 204 is configured to extract content of the buffer from the received inbound data packet and provide the buffer, or the content of the buffer, to cursor display module 206. An example of a process executed by communication module 204 for receiving an inbound data packet and extracting buffer content from the inbound data packet is shown in and described below in connection with FIG. 5B.

Cursor display module 206 is configured to receive buffer content (e.g., from communication module 204) and present a representation of a cursor of a remote client device on a display of the client device on which cursor display module 206 is operating. For example, cursor display module 206 presents a series of animations traversing from a position based on the first cursor coordinate to a position based on the last cursor coordinate in the buffer, effectively causing the representation of the cursor displayed on the client device to mimic the movement of the cursor on the remote client device during the throttle time period over which the cursor coordinates were captured on the remote client device. In one embodiment, the positions the representation of the cursor is animated to correspond to the cursor coordinates in the buffer. However, in one embodiment, such as in instances in which processor usage on the client device is relatively heavy, cursor display module 206, animates the representation of the cursor to one or more positions that are interpolated between cursor coordinates, thereby allowing cursor display module 206 to mimic the movement of the cursor based on the cursor coordinates without following the timing associated with each cursor coordinate in the buffer. Examples of paths of a representation of a cursor are shown in and described below in connection with FIGS. 3A and 3B. An example of a process for presenting a representation of a cursor is shown in and described below in connection with FIG. 6.

It should be noted that, cursor coordinate capture module 202, communication module 204, and/or cursor display module 206 have the capability to execute in parallel. In one example, communication module 204 receives data packets that include information indicative of cursor movements on other client devices participating in a co-editing session, and, concurrently, cursor display module 206 renders representations of cursors of the other client devices. As a more particular example, cursor display module 206 renders remote cursor representations from buffers that have already been received, and, concurrently, communication module 204 receives additional data packets with which to continue filling the buffers.

Figure 3A:
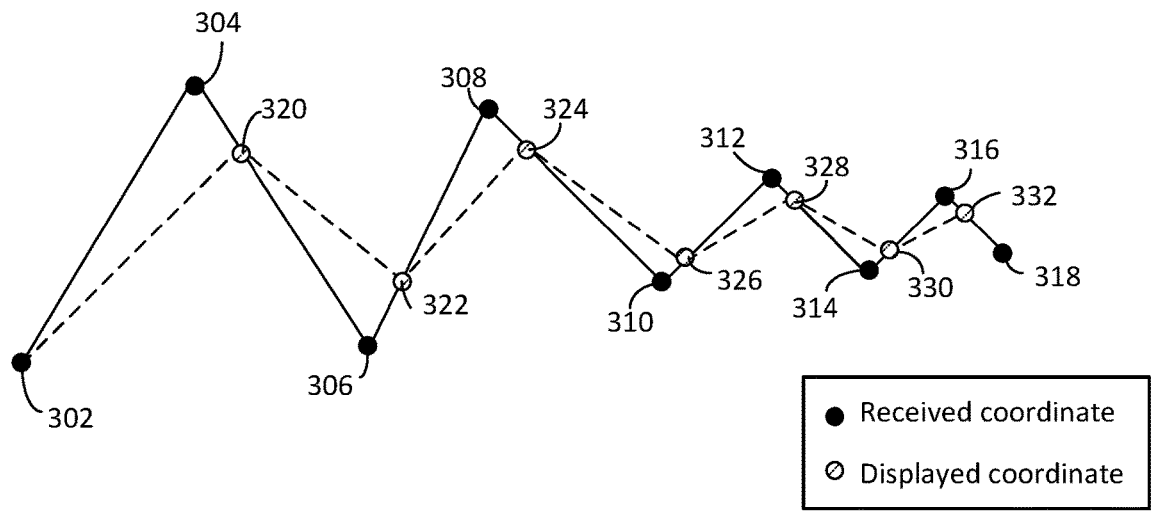
FIGS. 3A and 3B show diagrams of example cursor paths in accordance with one embodiment.

Turning to FIG. 3A, an example of presenting a representation of a cursor of a remote client device under a situation of relatively low usage of computing resources is shown in accordance with one embodiment. Cursor coordinates 302-318 (e.g., the black dots) represent a series of captured cursor coordinates over a throttle time period. In one embodiment, cursor coordinates 302-318 are assumed to evenly span the throttle time period. For example, in an instance in which the throttle time period is 450 milliseconds, a duration between each of the 9 cursor coordinates of cursor coordinates 302-318 is 50 milliseconds. In one embodiment, a first position of the representation of the cursor of the remote client device is presented at the first cursor coordinate (e.g., cursor coordinate 302). Displayed cursor positions 320-332 illustrate the remaining positions the representation of the cursor is animated to. For example, the representation of the cursor is animated to position 320, which is an interpolated value between captured cursor coordinate 304 and captured cursor coordinate 306. As another example, the representation of the cursor is then animated to position 322, which is an interpolated value between captured cursor coordinate 306 and captured cursor coordinate 308.

In one embodiment, the interpolated value is determined based on a time at which the animation occurs relative to how much time has elapsed with respect to the throttle time period. The interpolated value is determined, for example, based on a duration of time between a time point associated with a captured cursor coordinate and a time point associated with the interpolated value (e.g., a time point at which the interpolated value is displayed). By way of illustration, in an instance in which the throttle time period is 450 milliseconds, and captured cursor coordinates correspond to time points of [0 milliseconds, 50 milliseconds, 100 milliseconds, 150 milliseconds, 200 milliseconds, 250 milliseconds, 300 milliseconds, 350 milliseconds, 400 milliseconds, and 450 milliseconds], position 320 is identified by: 1) determining a duration of time that has elapsed since the inbound data packet associated with the captured cursor coordinates was received; 2) identifying two captured cursor coordinates that span the duration of elapsed time; and 3) interpolating between the two captured cursor coordinates based on the duration of time that has elapsed. By way of example, in an instance in which the duration of time that has elapsed is 75 milliseconds, position 320 is identified as a position that is halfway between the positions of cursor coordinates 304 and 306, because cursor coordinates 304 and 306 correspond to 50 milliseconds and 100 milliseconds, respectively.

Figure 3B:
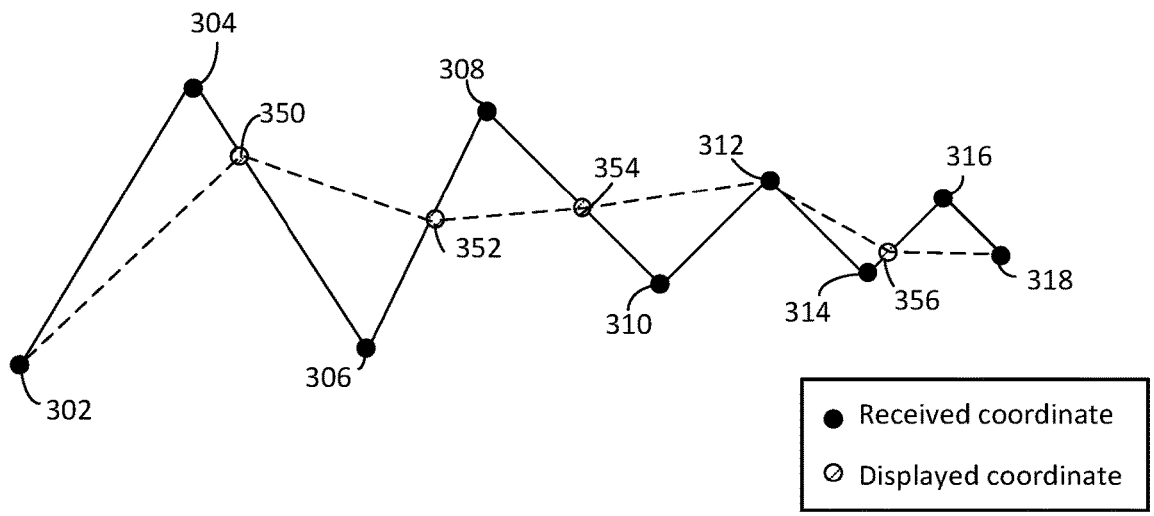

Turning to FIG. 3B, an example of a representation of a cursor of a remote device in a situation of relatively high usage of computing resources is shown in accordance with one embodiment. In an instance in which cursor coordinates 302-318 are received under high computing resources usage circumstances, a smaller number of representations of the cursor coordinates is presented. For example, rather than animating the representation of the cursor between 9 successive positions (whether corresponding to cursor coordinates 302-318 or interpolated values between 302-318), the representation of the cursor is animated between a smaller number of successive positions (e.g., 4, 5, 6, or the like). In the example shown in FIG. 3B, the representation of the cursor is animated between positions 302, 350, 352, 354, and 356. The positions are determined based on interpolation between two coordinates of cursor coordinates 302-318 and a duration of time that has elapsed since an inbound data packet associated with the cursor coordinates 302-318 was received.

In one embodiment, a client device participating in a co-editing session captures cursor coordinates and stores at least a portion of the captured cursor coordinates in a buffer (e.g., in an array). The portion of the captured cursor coordinates that are stored in the buffer are separated by at least a minimum sampling time period. Example durations of the sampling time period are 15 milliseconds, 18 milliseconds, 21 milliseconds, 24 milliseconds, or the like. In one embodiment, the sampling time period duration is less than or substantially similar to a frame rate at which the human visual system no longer perceives continuous motion between frames, e.g., the sampling frame rate is roughly about 16 milliseconds or 17 milliseconds. In one embodiment, at least a portion of captured cursor coordinates are stored in the buffer until a throttle time period has elapsed. Example durations of the throttle time period are 400 milliseconds, 500 milliseconds, 600 milliseconds, 700 milliseconds, or the like. The throttle time period is based at least in part on network load handleable by a co-editing service. In one embodiment, cursor coordinates are captured responsive to a mouse movement detection event. The mouse movement event is detected, for example, using an event handler, such as a JavaScript event handler. By storing cursor coordinates according to a sampling time period and bundling the stored cursor coordinates according to a throttle time period, network bandwidth associated with transmission of such cursor coordinates to remote devices is reduced.

Figure 4:
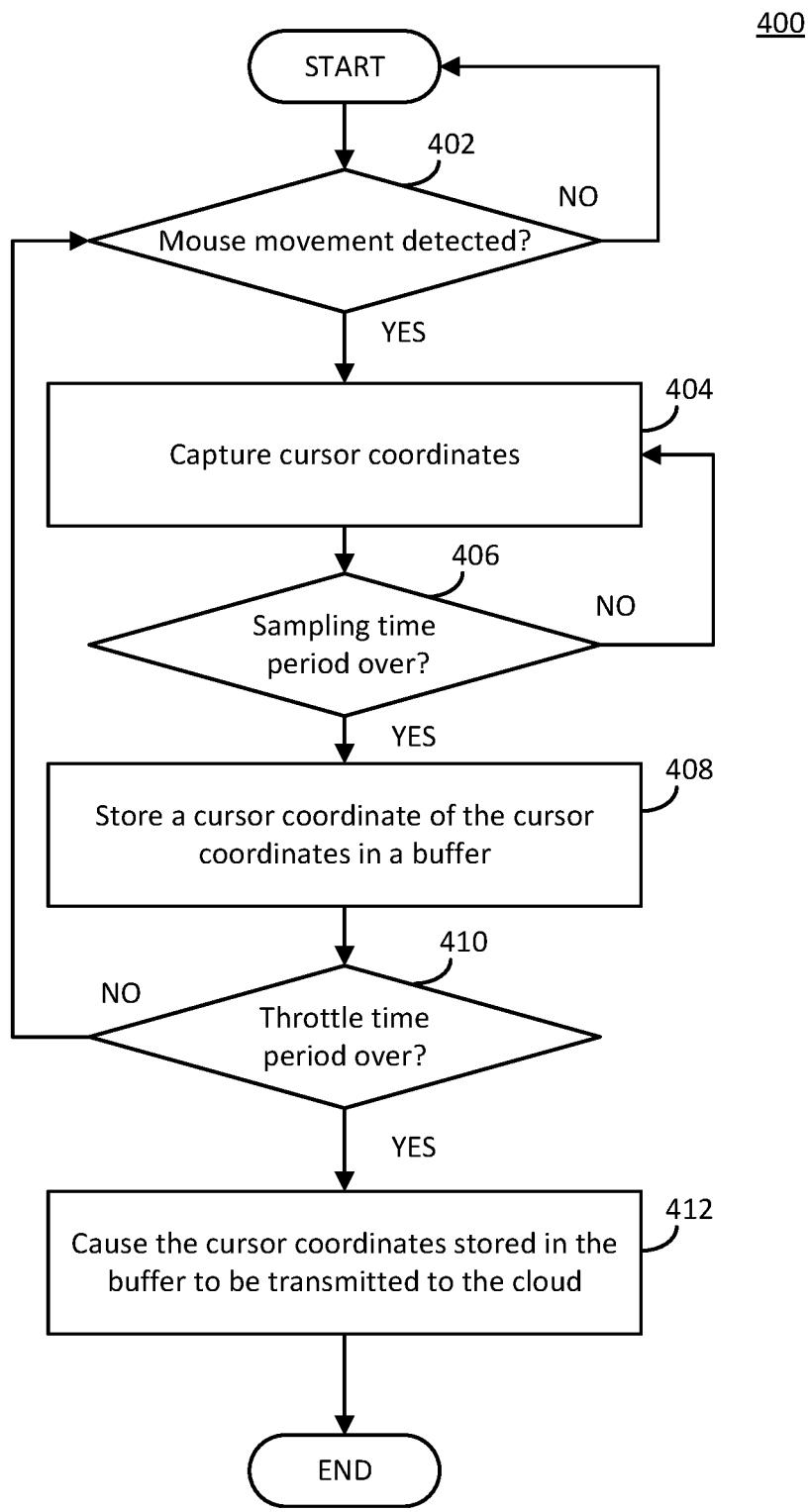
FIG. 4 shows an example of a process for capturing and transmitting cursor coordinates in accordance with one embodiment.

FIG. 4 shows an example flowchart of a process 400 for capturing and transmitting cursor coordinates from a client device participating in a co-editing session. In one embodiment, process 400 is executed by a cursor coordinate capture module operating on a client device, such as cursor coordinate capture module 202 of FIG. 2. In one embodiment, blocks of process 400 are executed in an order other than what is shown in FIG. 4. In one embodiment, two or more blocks of process 400 are executed substantially in parallel. In one embodiment, one or more blocks of process 400 are omitted.

Process 400 begins at block 402 by determining whether a mouse movement has been detected. In one embodiment, detection of a mouse movement is via an event handler, such as a JavaScript event handler. In one embodiment, the event handler executes during the co-editing session. In one example, the event handler is initialized and/or initiated in response to the co-editing session beginning.

If, at block 402, process 400 determines that no mouse movement has been detected ("no" at block 402), process 400 loops back to the beginning of process 400. In other words, process 400 waits for a mouse movement to be detected.

Conversely, if, at block 402, process 400 determines that mouse movement has been detected ("yes" at block 402), process 400 captures a cursor coordinate at block 404. In one embodiment, the cursor coordinates are in Cartesian coordinates. In one example, the cursor coordinates are (x, y) coordinates representing a distance from a left-most edge (or right-most edge) of the display of the client device and a bottom-most edge (or top-most edge) of the client device, respectively.

It should be noted that, in one embodiment, block 402 is omitted. For example, in one embodiment, process 400 is configured to capture cursor coordinates at block 404 regardless of whether a mouse movement was detected at block 402.

At block 406, process 400 determines whether a sampling time period is over (e.g., has elapsed). Example values of the time period include 15 milliseconds, 18 milliseconds, 21 milliseconds, 24 milliseconds, or the like. In one embodiment, the sampling time period is hard-coded for a duration of a co-editing session. In one embodiment, the sampling time period is variable within a co-editing session. In one example, the sampling time period varies depending on a computational load of the client device.

If, at block 406, process 400 determines that the sampling period is not over ("no" at block 406), process 400 loops back to block 404 and captures additional cursor coordinates. Process 400 loops through blocks 404 and 406 until the sampling time period is over (e.g., has elapsed). In one embodiment, process 400 loops through blocks 404 and 406 with a frequency of once per 1 millisecond, once per 2 milliseconds, once per 3 milliseconds, or the like.

Conversely, if, at block 406, process 400 determines that the sampling time period is over ("yes" at block 406), process 400 stores a cursor coordinate of the cursor coordinates captured during execution of block 404 in a buffer at 408. In instances in which block 404 is executed multiple times (e.g., during multiple loops through blocks 404 and 406), process 400 stores a single cursor coordinate of the multiple cursor coordinates captured during the multiple executions of block 404. In one example, process 400 stores the most recently captured cursor coordinate. In instances in which block 404 is executed one time, process 400 stores the cursor coordinate captured during the single execution of block 404.

At block 410, process 400 determines whether a throttle time period is over. In one embodiment, the throttle time period is longer than the sampling time period (e.g., by a factor of 1.5, 2, 2.5, or the like). Examples durations of the throttle time period are 400 milliseconds, 500 milliseconds, 600 milliseconds, 700 milliseconds, or the like. In one embodiment, the throttle time period is hard-coded (e.g., for a particular co-editing session). In one embodiment, the throttle time period depends on various factors, such as a network load handleable by the cloud service. In one example, the cloud service receives and/or transmits 2 packets per client device per second. Continuing with this example, a throttle time period of 500 milliseconds allows the cloud service to receive and/or transmit 2 packets per client device per second. In one embodiment, a value associated with the throttle time period is received from a cloud service associated with the co-editing session.

If, at block 410, process 400 determines that the throttle time period has not elapsed ("no" at block 410), process 400 loops back to block 402 and determines if a mouse movement is detected. In one embodiment, process 400 loops through blocks 402-412 until the throttle time period has elapsed. Conversely, if, at block 410, process 400 determines that the throttle time period has elapsed ("yes" at block 410), process 400 causes the cursor coordinates stored in the buffer to be transmitted to the cloud at block 412. For example, process 400 provides the contents of the buffer to a communication module, as shown in and described above in connection with FIG. 2.

In one embodiment, buffer data, indicative of cursor positions on a client device during a co-editing session and over a throttle time period, are packaged in a data packet such as a UDP or TCP data packet. In one embodiment, a client device participating in a client session generates a single data packet that includes content of a buffer, and transmits the single data packet to a cloud service associated with the co-editing session. The cloud service then causes the data packet to be transmitted to each of the remote device participating in the co-editing session so that each remote device uses the content of the buffer included in the data packet to display a representation of the cursor of the device that transmitted the data packet. It should be noted that each client device participating in the co-editing session both transmits outbound data packets indicative of cursor positions of the client device (e.g., as shown in and described below in connection with FIG. 5A), and receives inbound data packets from the other device participating in the co-editing session (e.g., as shown in and described below in connection with FIG. 5B).

Figure 5A:
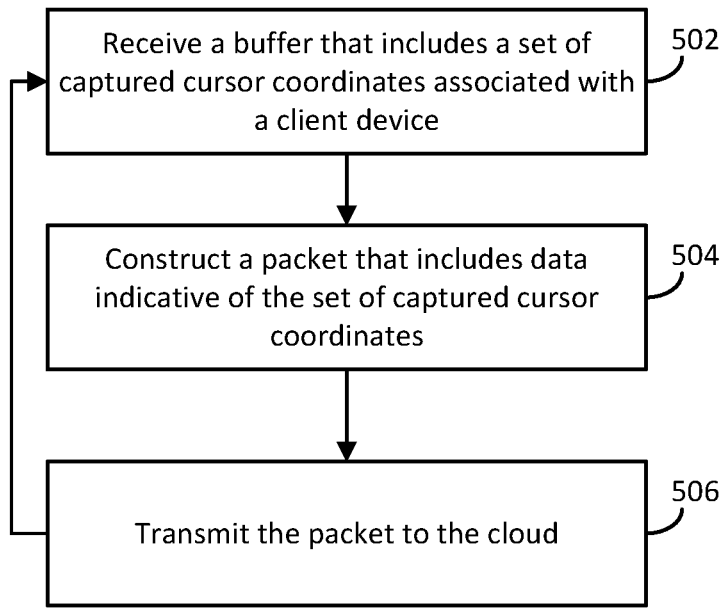
FIG. 5A shows an example of a process for transmitting data packets indicative of captured cursor coordinates in accordance with one embodiment.

FIG. 5A shows an example of a process 500 for generating and transmitting data packets that include buffer data indicative of cursor coordinates associated with a client device participating in a co-editing session in accordance with one embodiment. In one embodiment, blocks of process 500 are performed in an order other than what is shown in FIG. 5A. In one embodiment, two or more blocks of process 500 are performed substantially in parallel. In one embodiment, one or more blocks of process 500 are omitted. In one embodiment, process 500 is executed by a communication module of the client device, such as communication module 204 shown in and described above in connection with FIG. 2.

Process 500 begins at block 502 by receiving a buffer that include a set of captured coordinates associated with a client device. In one embodiment, the buffer represents cursor positions during a throttle time period. The buffer has a size that depends on an amount of movement of the cursor during the throttle time period. In one embodiment, the buffer is received at communication module 204 from a cursor coordinate capture module 202, as shown in and described above in connection with FIG. 2.

At block 504, process 500 constructs a packet that includes data indicative of the set of captured cursor coordinates. In one embodiment, the packet is a UDP packet. In one embodiment, a size of the payload of the data packet has a size that depends on a size of the buffer. In other words, in some examples, the size of the payload depends on the amount of movement of the cursor during the throttle time period. By way of example, assuming a sampling time period of 18 milliseconds and a throttle time period of 500 milliseconds, and assuming movement of the cursor during the entire throttle time period, the buffer array has 27 cursor coordinates. Given a payload of 8 bytes per buffer array element (e.g., per cursor coordinate), a corresponding UDP data packet has a size of (8 bytes*27 buffer elements)+ 64=280 bytes, wherein 64 bytes is a size of the UDP data packet header. It should be noted that, for a sampling time period of 18 milliseconds and a throttle time period of 500 milliseconds, in some examples, the packet is smaller than 280 bytes, such as in instances in which the cursor is not moving during a portion of the throttle time period.

At block 506, process 500 transmits the packet to the cloud service associated with the co-editing session. In one embodiment, the cloud service then transmits the packet to the other devices participating in the co-editing session. In one embodiment, process 500 then loops back to block 502 and receives another buffer that includes a set of captured cursor coordinates associated with the subsequent throttle time period. In one embodiment, by looping through blocks 502-506 during the co-editing session, process 500 sends a packet for every throttle time period. By way of example, for a throttle time period of 500 milliseconds, process 500 transmits 2 data packets per second. In the example given above, for a data packet of 280 bytes, 560 bytes are transmitted per second for a data rate of 0.56 kilobytes per second.

Figure 5B:
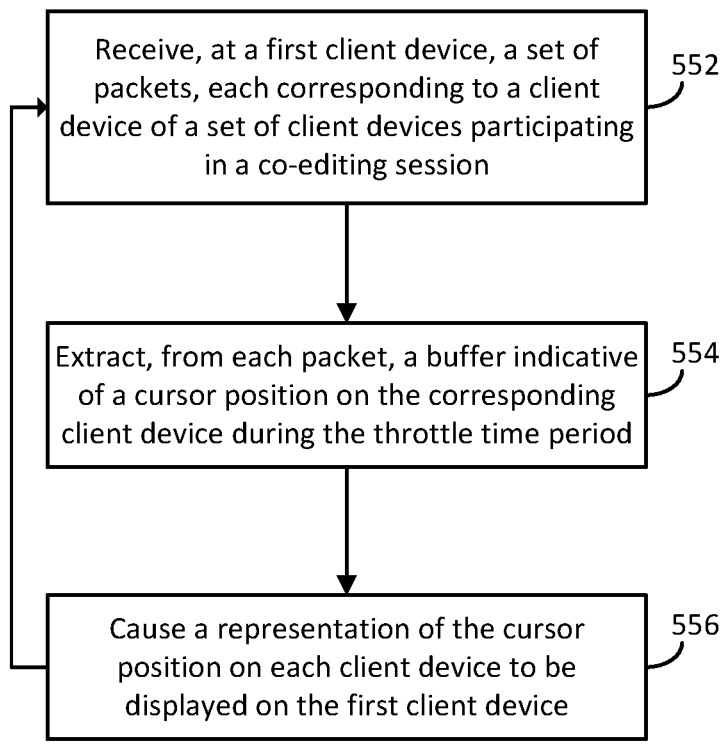
FIG. 5B shows an example of a process for receiving data packets indicative of cursor coordinates of remote devices in accordance with one embodiment.

FIG. 5B shows an example of a process 550 for receiving, at a client device, data packets from other client devices participating in a co-editing session in accordance with one embodiment. In one embodiment, blocks of process 550 are executed in an order other than what is shown in FIG. 5B. In one embodiment, two or more blocks of process 550 are executed substantially in parallel. In one embodiment, one or more blocks of process 550 are omitted. In one embodiment, process 550 is executed by a communication module, such as communication module 204 shown in and described above in connection with FIG. 2.

Process 550 begins at block 552 by receiving, at a first client device, a set of packets, each transmitted by another client device of a set of client device participating in the co-editing session. In one embodiment, each packet is a UDP packet. Continuing with the example given above in connection with FIG. 5A, in an instance in which the sampling time period is 18 milliseconds and the throttle time period is 550 milliseconds, the packet has a size of 280 bytes, assuming movement of the cursor during the most or the entirety of the throttle time period. Continuing still further with this example, in an instance in which there are 10 other devices participating in the co-editing session, the first client device receives 280 bytes×10 devices=2.8 kilobytes of data, spread across 10 packets.

At block 554, process 550 extracts, from each packet, a buffer indicative of cursor positions on the corresponding device during the throttle time period. In one embodiment, process 550 extracts the buffer by identifying a payload of the packet that is not part of a header of the packet.

At block 556, process 550 causes the representation of the cursor position on each client device to be displayed on the first client device. For example, in one embodiment, process 550 provides the extracted buffer arrays to a cursor display module, such as cursor display module 206, as shown in and described above in connection with FIG. 2.

In one embodiment, process 550 loops back to block 552 and receives, at the first client device, another set of packets. For example, in an instance in which the throttle time period is 500 milliseconds, process 550 receives 2 packets per second from each other device participating in the co-editing session. Continuing with the example given above, in an instance in which the throttle time period is 500 milliseconds and each packet has a size of 280 bytes, process 550 receives (280 bytes×2 packets per second)×10 devices=5600 bytes per second, or 5.6 kilobytes per second. In one embodiment, process 550 loops through blocks 552-556 for the duration of the co-editing session.

In one embodiment, a client device presents representations of cursors of the remote devices participating in the co-editing session. The representations of the cursors are presented based at least in part on the content of buffers included in data packets received at the client device.

In one embodiment, a representation of a cursor is presented as an animation, or as a series of animations between positions. In one example, the positions correspond to captured cursor coordinates included in a buffer. In another example, at least one position is a position interpolated between two successive captured cursor coordinates. By presenting a representation of a cursor as an animation between interpolated cursor positions, the client device displays the representation of the cursor with a speed that accommodates computing resources necessary to perform other functions but that is still a faithful representation of cursor positioning on the remote device.

Figure 6:
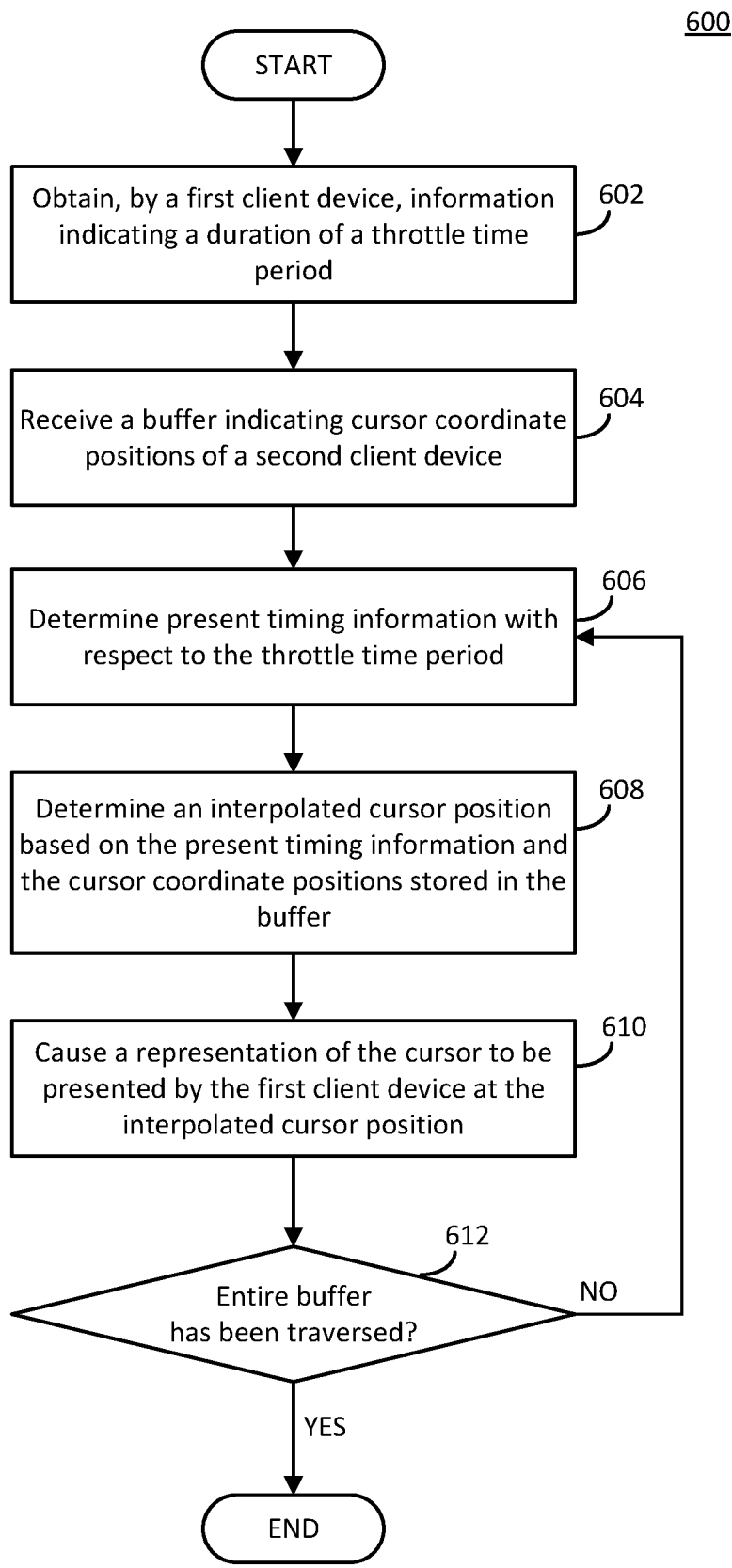
FIG. 6 shows an example of a process for displaying a representation of one or more cursors in connection with a co-editing session in accordance with one embodiment.

FIG. 6 shows an example of a process 600 for displaying, on a first client device, a representation of a cursor of a second client device (e.g., a remote device) in accordance with some embodiments. In one embodiment, blocks of process 600 are performed in an order other than what is shown in FIG. 6. In one embodiment, two or more blocks of process 600 are performed substantially in parallel. In one embodiment, one or more blocks of process 600 are omitted. In one embodiment, process 600 is executed by a cursor display module of the first client device, such as cursor display module 206 as shown in and described above in connection with FIG. 2.

Process 600 begins at block 602 by obtaining, by a first client device, information indicating a duration of a throttle time period. In one embodiment, process 600 obtains the information indicating the duration of the throttle time period from a cloud service that provides inbound data packets to the first client device. The throttle time period is obtained, for example, at the beginning of the co-editing session.

At block 604, process 600 receives a buffer indicating cursor coordinate positions of a second client device. In one embodiment, the cursor coordinate positions were collected during a throttle time period on the second client device. In one embodiment, the buffer was included in a data packet transmitted to the second client device and received at the first client device (e.g., by a communication module of the first client device that extracted the buffer and provided the buffer to process 600). In one embodiment, the data packet was received at the first client device via an intermediate cloud service.

An example of the buffer is: [(0, 100), (0, 150), (0, 200), (0, 300), (0, 400), (0, 500)]1, indicating a straight rightward movement of the cursor on the second client device during the throttle time period. It should be noted that, in one embodiment, each element of the buffer is assumed to be spaced equidistantly across the throttle time period, regardless of the timing of when the cursor coordinates were captured on the second client device. Accordingly, assuming a throttle time period of 500 milliseconds, the 6 elements of the example buffer given above are assumed to be associated with time points of 0 milliseconds, 100 milliseconds, 200 milliseconds, 300 milliseconds, 400 milliseconds, and 500 milliseconds, respectively.

At block 606, process 600 determines present timing information with respect to the throttle time period. For example, process 600 determines a duration of time that has elapsed since the inbound data packet that includes the buffer array received at block 604 was received at the first client device, where the time that the inbound data packet was received corresponds to the start of the throttle time period. In one embodiment, process 600 determines an overall or total distance traversed by the cursor during the throttle period. For example, given an example buffer content of [(0, 100), (0, 150), (0, 200), (0, 300), (0, 400), (0, 500)]1, process 600 determines that the overall total distance traversed by the cursor during the throttle period is 500-100=400 units (e.g., pixels, or any other suitable unit). It should be noted that, in one embodiment, process 600 ensures that the entire distance is traversed in the remote representation of the cursor during execution of process 600.

At block 608, process 600 determines an interpolated cursor position based on the present timing information and the cursor coordinate positions stored in the buffer. Continuing with the example buffer given above of [(0, 100), (0, 150), (0, 200), (0, 300), (0, 400), (0, 500)]1, where the elements correspond to time points of 0 milliseconds, 100 milliseconds, 200 milliseconds, 300 milliseconds, 400 milliseconds, and 500 milliseconds, respectively, the interpolated cursor position is determined by identifying two cursor positions in the buffer that span the present timing information. In one embodiment, process 600 performs linear interpolation to identify the interpolated cursor position. In one example, if the present timing information indicates that 200 milliseconds have elapsed since the inbound data packet associated with the buffer was received, process 600 determines that 40% of the buffer time has elapsed (200/500 milliseconds=0.4, or 40%). Continuing still further with this example, because 40% of the total distance to be traversed by the cursor during the throttle period is 160 units (40% of 400 units=160 units), and because the cumulative distance associated with the buffer coordinate positions of (0, 200) and (0, 300) is 100 and 200 units, respectively, process 600 determines the interpolated position by interpolating between the buffer coordinate positions of (0, 200) and (0, 300). In one example, process 600 determines that the cursor position given ideal rendering of 160 units (e.g., that would have ideally been traversed in past 200 milliseconds) is 60 units after (0, 200), because (0, 200) is 100 units from the cursor start position. Using linear interpolation between the buffer cursor coordinates of (0, 200) and (0, 300), which span a distance of 100 units, process 600 determines that the interpolated value is (0, 260). In another example, process 600 performs linear interpolation based on the total distance traversed by the cursor as indicated by the coordinates in the buffer, the present timing information, and/or a distance that has already been traversed in the remote cursor representation. Using the example buffer given above in which the total distance is 400 units, and in an instance in which 300 milliseconds have elapsed since the inbound data packet associated with the buffer was received (where the buffer spans 500 milliseconds), process 600 can determine that the cursor is to have traversed 0.6 of the total distance, because 300 milliseconds/500 milliseconds is 0.6. Continuing with this example, process 600 determines that 0.6 of the total distance is 240 units. In an instance in which the present remote cursor position corresponds to traversing 50 units of the 400 total units to be traversed (e.g., in an instance in which the cursor is at position (0, 150), from the starting position of (0, 100)), process 600 determines that a remaining 350 units (e.g., 400 units −50 units) are to be traversed in the remaining 200 milliseconds (e.g., 500 milliseconds −300 milliseconds). Continuing still further with this example, process 600 then linearly interpolates between the points associated with (0, 200) and (0, 300) to identify the next interpolated cursor position, based on the distance that would have been traversed by the remote cursor given ideal rendering is 240 units, which is spanned by the points (0, 200) and (0, 300). In one embodiment, in an instance in which the timing information is at or after the last time point of the buffer (e.g., more than the throttle time period has elapsed since the inbound data packet was received), the interpolated cursor position is considered to be the last cursor position in the buffer.

At block 610, process 600 causes a representation of the cursor to be presented by the first client device at the interpolated cursor position. For example, in one embodiment, the representation of the cursor is presented as traversing from a previous position to the interpolated cursor position as an animation. As a more particular example, multiple intermediate positions between the previous position and the interpolated cursor position are determined, and the representation of the cursor is presented at each intermediate position in succession to generate the animation.

At block 612, process 600 determines whether the entire buffer has been traversed. For example, process 600 determines whether the representation of the cursor has been presented at the last cursor position in the buffer. As another example, process 600 determines whether more than the throttle time period has elapsed since the inbound data packet was received.

If, at block 612, process 600 determines that the entire buffer has not been traversed, process 600 loops back to block 606 and determines subsequent timing information with respect to the throttle time period. Conversely, if, at block 612, process 600 determines that the entire buffer has been traversed, process 600 ends.

Figure 7:
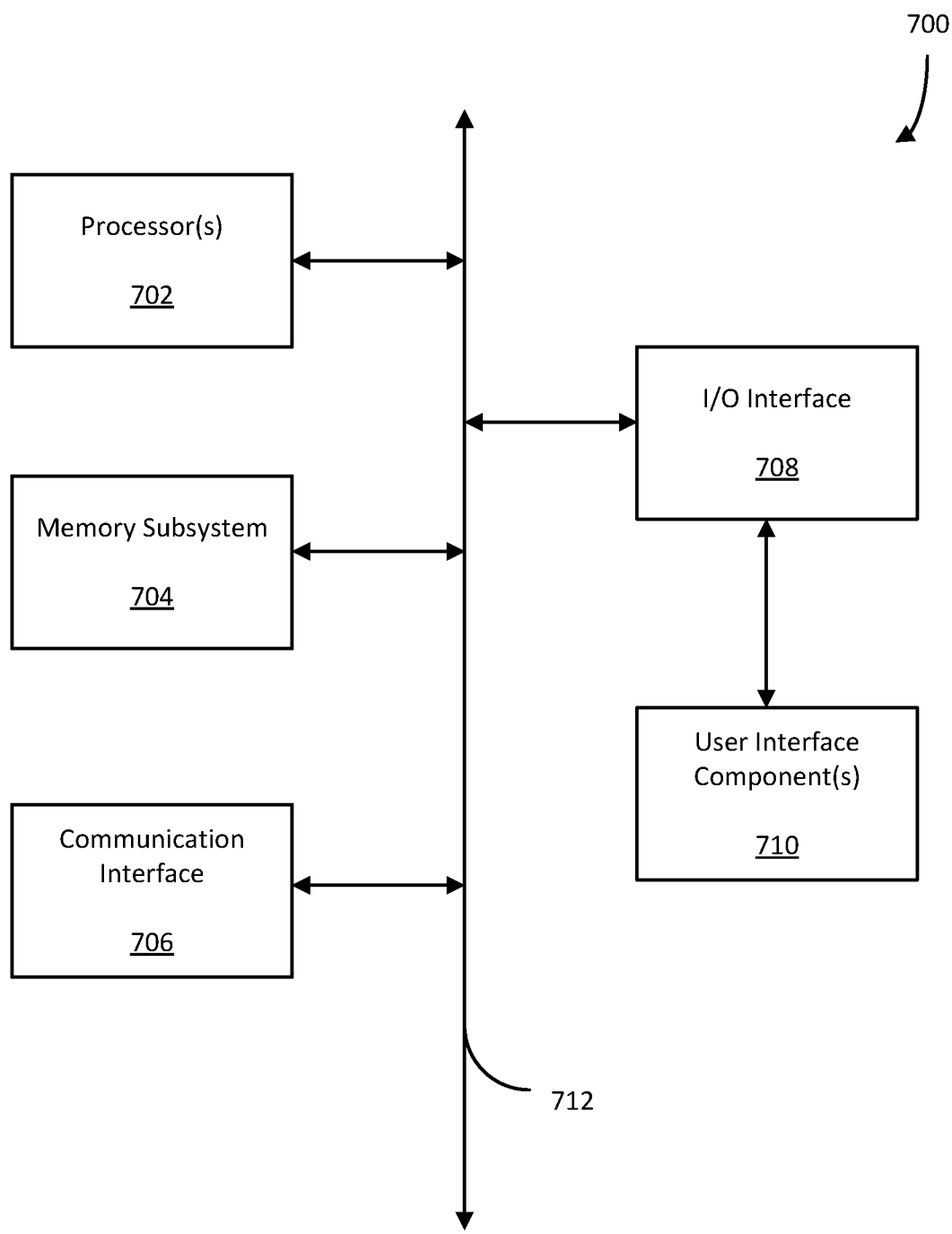
FIG. 7 shows a schematic diagram of an example computing device for implementing the methods, systems, and techniques described herein in accordance with one embodiment.

FIG. 7 shows a schematic diagram of components of a computing device 700 that is implemented in a computing system in accordance with one embodiment. As illustrated, computing device 700 includes a bus 712 that directly or indirectly couples one or more processors(s) 702, a memory subsystem 704, a communication interface 706, an input/output (I/O) interface 708, and/or one or more user interface components 710. It should be noted that, in one embodiment, various other components are included in a computing device that are not shown in FIG. 7, and/or one or more components shown in FIG. 7 are omitted.

In one embodiment, computing device 700 includes or is coupled to a memory subsystem 704. Memory subsystem 704 includes a computer-readable medium (e.g., non-transitory storage medium) or a combination of computer-readable media. Examples of computer-readable media include optical media (e.g., compact discs, digital video discs, or the like), magnetic media (e.g., hard disks, floppy disks, or the like), semiconductor media (e.g., flash memory, dynamic random access memory (DRAM), static random access memory (SRAM), electrically programmable read-only memory (EPROM), electrically erasable programmable read-only memory (EEPROM), or the like), or a combination thereof. In one embodiment, the computer-readable media includes non-volatile memory, volatile memory, or a combination thereof. In one embodiment, memory subsystem 704 also includes one or more hardware devices such as a solid-state memory, one or more hard drives, one or more optical disk drives, or the like. In one embodiment, memory subsystem 704 stores content files such as text-based files, audio files, image files, and/or video files, etc. In one embodiment, the content files include documents, pictures, photos, songs, podcasts, movies, etc. In one embodiment, memory subsystem 704 stores one or more computer program products that are each implemented as a set of instructions (e.g., program code) stored on a computer-readable medium.

A computer program product (e.g., a program stored in or downloadable onto a computer readable medium) includes instructions or program code that are executable by one or more processors (e.g., processor(s) 702, or processor(s) of another computing device communicatively coupled to computing device 700) to perform various operations or functions such as those described with reference to FIGS. 4, 5A, 5B, and 6. In one embodiment, a computer program product is referred to as a non-transitory computer readable medium storing or comprising instructions to perform certain operations or functions. Examples of a computer program product include firmware, software driver, operating system, or software application. Examples of a software application include data management application (e.g., file management application, document management application, media management application, database application, etc.), communication application (e.g., email application, messaging application, teleconference or meeting application, social media application, etc.), productivity applications (e.g., document viewer application, document creation or editing application, etc.), media or interactive application (e.g., web browser, image or photo viewer, audio or video playback application, gaming application, virtual or augmented reality application, shopping application, recommendation or review application, etc.), creativity applications (e.g., image, drawing, photo, audio, or video creation or editing application, web page development applications, virtual or augmented reality creation or editing applications, graphic design applications, etc.), or the like.

In one embodiment, a computer program product such as any of the example software application are implemented using one or more neural network or machine learning models. In such embodiments, one or more neural network or machine learning models are trained using computing device 700 (or a computing system that includes computing device 700). Furthermore, in one embodiment, computing device 700 (or a computing system include computing device 700) executes the one or more neural network or machine learning models as part of the computer program product to perform inference operations. It should be noted, in one embodiment, the neural network or matching learning model(s) are trained using a computing device or system that is the same as, overlaps with, or is separate from the computing device or system performing inference operations.

Communication interface 706 is used by computing device 700 to communicate with one or more communication networks, and/or other electronic device(s). Example types of communication networks include wired communication networks and/or wireless communication networks. Example types of communication networks include the Internet, a wide-area network, a local-area network, a virtual private network (VPN), an Intranet, or the like. In one embodiment, communication interface 706 utilizes various drivers, wireless communication circuitry, network interface circuitry, or the like to enable communication via various communication networks.

I/O interface 708 includes various drivers and/or hardware circuitry for receiving input from various input devices, providing output to various output devices, or exchanging input/output with various input/output devices. Examples of devices coupled to I/O interface 708 include peripheral devices such as a printer, a docking station, a communication hub, a charging device, etc. In one embodiment, some devices coupled to I/O interface 708 are used as user interface component(s) 710. In one example, a user operates input elements of user interface component(s) 710 to invoke the functionality of computing device 700 and/or of another device communicatively coupled to computing device 700; a user views, hears, and/or otherwise experiences output from computing device 700 via output elements of user interface component(s) 710. Some user interface component(s) 710 provide both input and output functionalities. Examples of input user interface component include a mouse, a joystick, a keyboard, a microphone, a camera, or the like. Examples of output user interface component include a display screen (e.g., a monitor, an LCD display, etc.), one or more speakers, or the like. Examples of a user interface components provide both input and output functionalities include a touchscreen, haptic feedback controllers, or the like.

In one embodiment, a non-transitory computer-readable medium is provided to implement the remote content display techniques disclosed herein. The non-transitory computer-readable medium includes instructions that, when executed by at least one processor, cause the at least one processor to perform various operations. In one embodiment, the operations include storing, by a first client device of a plurality of client devices participating in a co-editing session over a network, a plurality of cursor coordinates in a buffer during a throttle time period, the plurality of cursor coordinates indicating movement of a cursor displayed on a display of the first client device. The operations further include determining that the throttle time period has elapsed. Responsive to a determination that the throttle time period has elapsed, the operations include obtaining the plurality of cursor coordinates from the buffer, generating a single data packet that contains the plurality of cursor coordinates, and transmitting the single data packet onto the network to provide the movement of the cursor displayed on the display of the first client device for display on the plurality of client devices other than the first client device.

In one embodiment, a client device is provided to implement the remote content display techniques disclosed herein. In one embodiment, the client device includes a cursor coordinate capture module. The cursor coordinate capture module has the capability to responsive to detecting cursor movement associated with the client device, capture one or more cursor coordinates, each representing a position of a cursor. The cursor coordinate capture module stores at least one of the one or more cursor coordinates in a buffer. The cursor coordinate capture module repeats the capture of cursor coordinates and storage of at least one of the captured cursor coordinates in a buffer until a throttle time period has elapsed. The cursor capture coordinate module provides content of the buffer to a communication module. The communication module has the capability to generate an outbound data packet that includes at least a portion of the content of the buffer. The communication module receives an inbound data packet, the inbound data packet transmitted by another client device participating in a co-editing session with the client device, and the inbound data packet including content of a second buffer generated by the other client device. The communication module extracts the content of the second buffer from the inbound data packet. In one embodiment, the client device comprises a cursor display module. The cursor display module has the capability to receive content of the second buffer from the communication module. The cursor display module causes a representation of a cursor of the other client device to be presented on a display of the client device based on cursor coordinates stored in the second buffer, each cursor coordinate representing a cursor position of a cursor associated with the other client device.

In one embodiment, a method is provided to implement the remote content display techniques disclosed herein. The method includes storing, by a first client device of a plurality of client devices participating in a co-editing session over a network, a plurality of cursor coordinates in a buffer during a throttle time period, the plurality of cursor coordinates indicating movement of a cursor displayed on a display of the first client device. The method further includes determining that the throttle time period has elapsed. Responsive to a determination that the throttle time period has elapsed, the method includes obtaining the plurality of cursor coordinates from the buffer. The method further includes generating a single data packet that contains the plurality of cursor coordinates and transmitting the single data packet onto the network to provide the movement of the cursor displayed on the display of the first client device for display on the plurality of client devices other than the first client device.

Various embodiments are described herein which are intended to be illustrative. Alternative embodiments may be apparent to those of ordinary skill in the art without departing from the scope of the disclosure. In one example, one or more features from one embodiment are combined with another embodiment to form an alternative embodiment. In another example, one or more features are omitted from an embodiment to form an alternative embodiment without departing from the scope of the disclosure. Additionally, it should be noted that, in some implementations, certain features described herein are utilized without reference to other features described herein.

With reference to the various processes described above, it should be understood that the order in which operations are performed is not limited to the order described herein. Moreover, in one embodiment, two or more operations are performed concurrently and/or substantially in parallel. In one embodiment, what is described as a single operation is split into two or more operations (e.g., performed by the same device, performed by two or more different devices, etc.). In one embodiment, what is described as multiple operations is combined into a single (e.g., performed by the same device, etc.). Descriptions of various blocks, modules, or components as distinct should not be construed as requiring that the blocks, modules, or components be separate (e.g., physically separate) and/or perform separate operations. In one example, two or more blocks, modules, and/or components are merged. As another example, a single block, module, and/or components is split into multiple blocks, modules, and/or components.

The phrases "in one embodiment," "in an embodiment," "in one example," and "in an example" are used herein. It should be understood that, in some cases, these phrases refer to the same embodiments and/or examples, and, in other cases, these phrases refer to different embodiments and/or examples. The terms "comprising," "having," and "including" should be understood to be synonymous unless indicated otherwise. The phases "A and/or B" and "A or B" should be understood to mean {A}, {B}, or {A, B}. The phrase "at least one of A, B, and C" should be understood to mean {A}, {B}, {C}, {A, B}, {A, C}, {B, C}, or {A, B, C}.

The invention claimed is:

1. A non-transitory computer-readable medium comprising instructions that, when executed by at least one processor, cause the at least one processor to perform operations comprising:
  storing, by a first client device of a plurality of client devices participating in a co-editing session over a network, a plurality of cursor coordinates in a buffer during a throttle time period, the plurality of cursor coordinates indicating movement of a cursor displayed on a display of the first client device;
  determining that the throttle time period has elapsed; and
  responsive to a determination that the throttle time period has elapsed:
    obtaining the plurality of cursor coordinates from the buffer;
    generating a single data packet that contains the plurality of cursor coordinates; and
    transmitting the single data packet onto the network to provide the movement of the cursor displayed on the display of the first client device for display on the plurality of client devices other than the first client device.

2. The non-transitory computer-readable medium of claim 1, wherein the operations further comprise causing a representation of at least one cursor associated with at least one client device of the plurality of client devices other than the first client device to be presented on the display of the first client device.

3. The non-transitory computer-readable medium of claim 1, wherein the single data packet comprises a user datagram protocol (UDP) packet.

4. The non-transitory computer-readable medium of claim 1, wherein each successive coordinate of the plurality of cursor coordinates is captured upon elapse of a sampling time period.

5. The non-transitory computer-readable medium of claim 4, wherein each successive coordinate of the plurality of cursor coordinates is captured upon:
  elapse of the sampling time period; and
  detection of a mouse movement event.

6. The non-transitory computer-readable medium of claim 5, wherein the mouse movement event corresponds to a mouse cursor position displacement equal to or greater than a displacement threshold.

7. The non-transitory computer-readable medium of claim 1, wherein the throttle time period is within a range of about 300 milliseconds-600 milliseconds.

8. A client device, comprising:
  a processor configured to execute a cursor coordinate capture module, a communication module, and a cursor display module;
  the cursor coordinate capture module configured to:
    (a) responsive to detecting cursor movement associated with the client device, capture one or more cursor coordinates, each representing a position of a cursor;
    (b) store at least one of the one or more cursor coordinates in a buffer;
    (c) repeat (a) and (b) until a throttle time period has elapsed; and
    (d) provide content of the buffer to a communication module, the communication module configured to:
  generate an outbound data packet that includes at least a portion of the content of the buffer;
  transmit the outbound data packet;
  receive an inbound data packet, the inbound data packet transmitted by another client device participating in a co-editing session with the client device, and the inbound data packet including content of a second buffer generated by the other client device; and
  extract the content of the second buffer from the inbound data packet; and the cursor display module configured to:
  receive content of the second buffer from the communication module; and
  cause a representation of a cursor of the other client device to be presented on a display of the client device based on cursor coordinates stored in the second buffer, each cursor coordinate representing a cursor position of a cursor associated with the other client device.

9. The client device of claim 8, wherein a plurality of cursor coordinates are represented in the outbound data packet.

10. The client device of claim 8, wherein a size of the outbound data packet depends at least in part on an amount of the cursor movement of the cursor during the throttle time period.

11. The client device of claim 8, wherein a size of the outbound data packet depends at least in part on a distance traversed by the cursor during the throttle time period.

12. The client device of claim 8, wherein to cause the representation of the cursor of the other client device to be presented on the display of the client device, the cursor display module is configured to present representations of interpolated cursor positions between a first position and a second position.

13. The client device of claim 12, wherein at least one of the first position or the second position is an interpolated value between two successive cursor coordinates stored in the second buffer.

14. The client device of claim 13, wherein the interpolated value is determined based at least in part on a total distance traversed by the cursor of the other client device as indicated by the cursor coordinates stored in the second buffer.

15. A method, comprising:
  storing, by a first client device of a plurality of client devices participating in a co-editing session over a network, a plurality of cursor coordinates in a buffer during a throttle time period, the plurality of cursor coordinates indicating movement of a cursor displayed on a display of the first client device;
  determining that the throttle time period has elapsed; and
  responsive to a determination that the throttle time period has elapsed:
    obtaining the plurality of cursor coordinates from the buffer;
    generating a single data packet that contains the plurality of cursor coordinates; and
    transmitting the single data packet onto the network to provide the movement of the cursor displayed on the display of the first client device for display on the plurality of client devices other than the first client device.

16. The method of claim 15, further comprising causing a representation of at least one cursor associated with at least one client device of the plurality of client devices other than the first client device to be presented on the display of the first client device.

17. The method of claim 15, wherein the single data packet comprises a user datagram protocol (UDP) packet.

18. The method of claim 15, wherein each successive coordinate of the plurality of cursor coordinates is captured upon elapse of a sampling time period.

19. The method of claim 18, wherein each successive coordinate of the plurality of cursor coordinates is captured upon:
   elapse of the sampling time period; and
   detection of a mouse movement event.

20. The method of claim 19, wherein the mouse movement event corresponds to a mouse cursor position displacement equal to or greater than a displacement threshold.

\* \* \* \* \*